United States Patent
Bronicki

(10) Patent No.: US 8,061,139 B2
(45) Date of Patent: Nov. 22, 2011

(54) INTEGRATED ENGINE GENERATOR RANKINE CYCLE POWER SYSTEM

(75) Inventor: Lucien Y. Bronicki, Yavne (IL)

(73) Assignee: Ormat Technologies, Inc., Reno, NV (US)

( * ) Notice: Subject to any disclaimer, the term of this patent is extended or adjusted under 35 U.S.C. 154(b) by 438 days.

(21) Appl. No.: 11/736,331

(22) Filed: Apr. 17, 2007

(65) Prior Publication Data

US 2007/0240420 A1 Oct. 18, 2007

Related U.S. Application Data

(63) Continuation-in-part of application No. 10/849,502, filed on May 20, 2004, now Pat. No. 7,353,653, which is a continuation-in-part of application No. 10/152,356, filed on May 22, 2002, now Pat. No. 6,883,328.

(30) Foreign Application Priority Data

Nov. 20, 2003 (IL) ............................................. 158989

(51) Int. Cl.
*F01K 23/10* (2006.01)
*F02G 3/00* (2006.01)
*F01B 31/00* (2006.01)

(52) U.S. Cl. .............................. 60/618; 60/616; 60/657

(58) Field of Classification Search ............ 60/614–624, 60/670, 645, 656, 657, 646; 290/36 R; 310/40 R; 184/6.3, 6.11
See application file for complete search history.

(56) References Cited

U.S. PATENT DOCUMENTS

| | | | | |
|---|---|---|---|---|
| 3,040,528 A | * | 6/1962 | Zvi et al. ....................... | 60/653 |
| 3,185,854 A | | 5/1965 | Hoffman | |
| 3,350,876 A | * | 11/1967 | Johnson ......................... | 60/618 |
| 3,830,062 A | * | 8/1974 | Morgan et al. ................ | 60/618 |
| 3,937,022 A | * | 2/1976 | Swearingen ................... | 60/657 |
| 4,002,224 A | | 1/1977 | Easter | |
| 4,300,353 A | * | 11/1981 | Ridgway ........................ | 60/618 |
| 4,309,870 A | * | 1/1982 | Guest et al. ................... | 60/39.08 |
| 4,358,930 A | * | 11/1982 | Pope et al. ..................... | 60/647 |
| 4,366,674 A | * | 1/1983 | Eakman ......................... | 60/618 |
| 4,570,077 A | * | 2/1986 | Lambley ........................ | 290/4 R |
| 4,586,338 A | * | 5/1986 | Barrett et al. .................. | 60/618 |
| 4,590,384 A | | 5/1986 | Bronicki | |

(Continued)

OTHER PUBLICATIONS

U.S. Appl. No. 12/647,216, filed Dec. 24, 2009, Kaplan, et al.

*Primary Examiner* — Kenneth Bomberg
*Assistant Examiner* — Christopher Jetton
(74) *Attorney, Agent, or Firm* — Oblon, Spivak, McClelland, Maier & Neustadt, L.L.P.

(57) ABSTRACT

The present invention provides an integrated engine generator Rankine cycle power system which increases the efficiency of the use of its power output. The system comprises a closed Rankine cycle power generating unit through which working fluid flows and an engine generator, the closed Rankine cycle power generating unit including a waste heat boiler for vaporizing said working fluid by means of exhaust gases discharged from the engine generator, an expander in which the vaporized working fluid expands and performs work to drive a shaft for producing mechanical power, or an electric generator coupled thereto and adapted to produce electrical power, from both the engine generator and the expander, and an external lubrication system in fluid communication with the expander wherein one or more closed Rankine cycle power generating unit components are operationally connected to the electric generator.

15 Claims, 5 Drawing Sheets

U.S. PATENT DOCUMENTS

| | | | |
|---|---|---|---|
| 4,629,033 A * | 12/1986 | Moore et al. | 184/6.3 |
| 4,831,817 A | 5/1989 | Linhardt | |
| 4,901,531 A * | 2/1990 | Kubo et al. | 60/618 |
| 5,487,765 A * | 1/1996 | Kedar et al. | 55/310 |
| 5,552,640 A * | 9/1996 | Sutton et al. | 290/40 B |
| 5,860,279 A * | 1/1999 | Bronicki et al. | 60/655 |
| 5,949,146 A * | 9/1999 | VandenBerghe | 290/40 R |
| 6,374,613 B1 * | 4/2002 | Filippone | 60/608 |
| 6,526,754 B1 | 3/2003 | Bronicki | |
| 6,526,764 B1 | 3/2003 | Singh | |
| 6,845,618 B2 * | 1/2005 | Niikura et al. | 60/618 |
| 6,883,328 B2 | 4/2005 | Bronicki | |
| 6,910,333 B2 * | 6/2005 | Minemi et al. | 60/618 |
| 2001/0054288 A1 * | 12/2001 | Bronicki et al. | 60/653 |
| 2003/0218385 A1 | 11/2003 | Bronicki | |
| 2005/0006957 A1 | 1/2005 | Bronicki | |

* cited by examiner

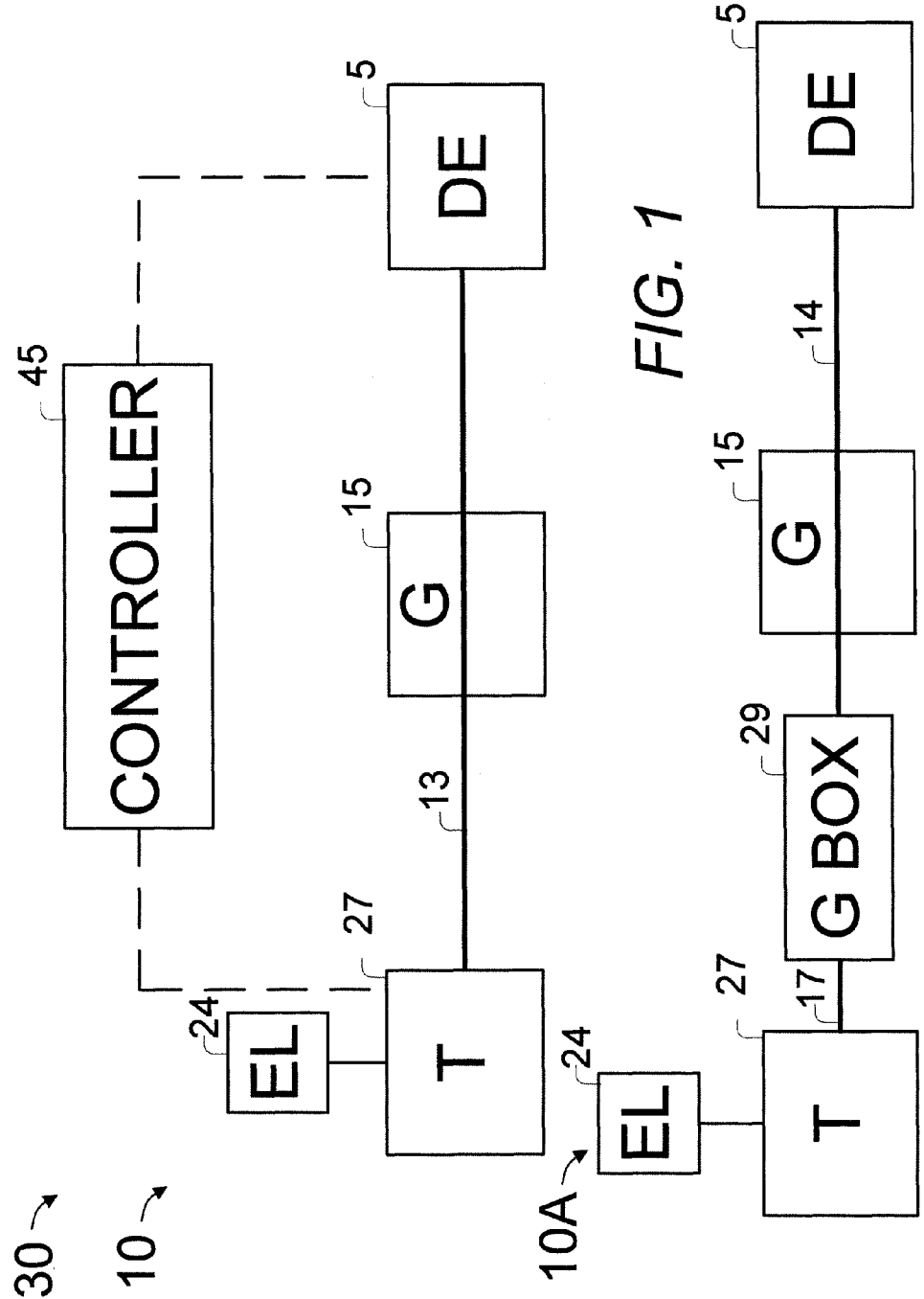

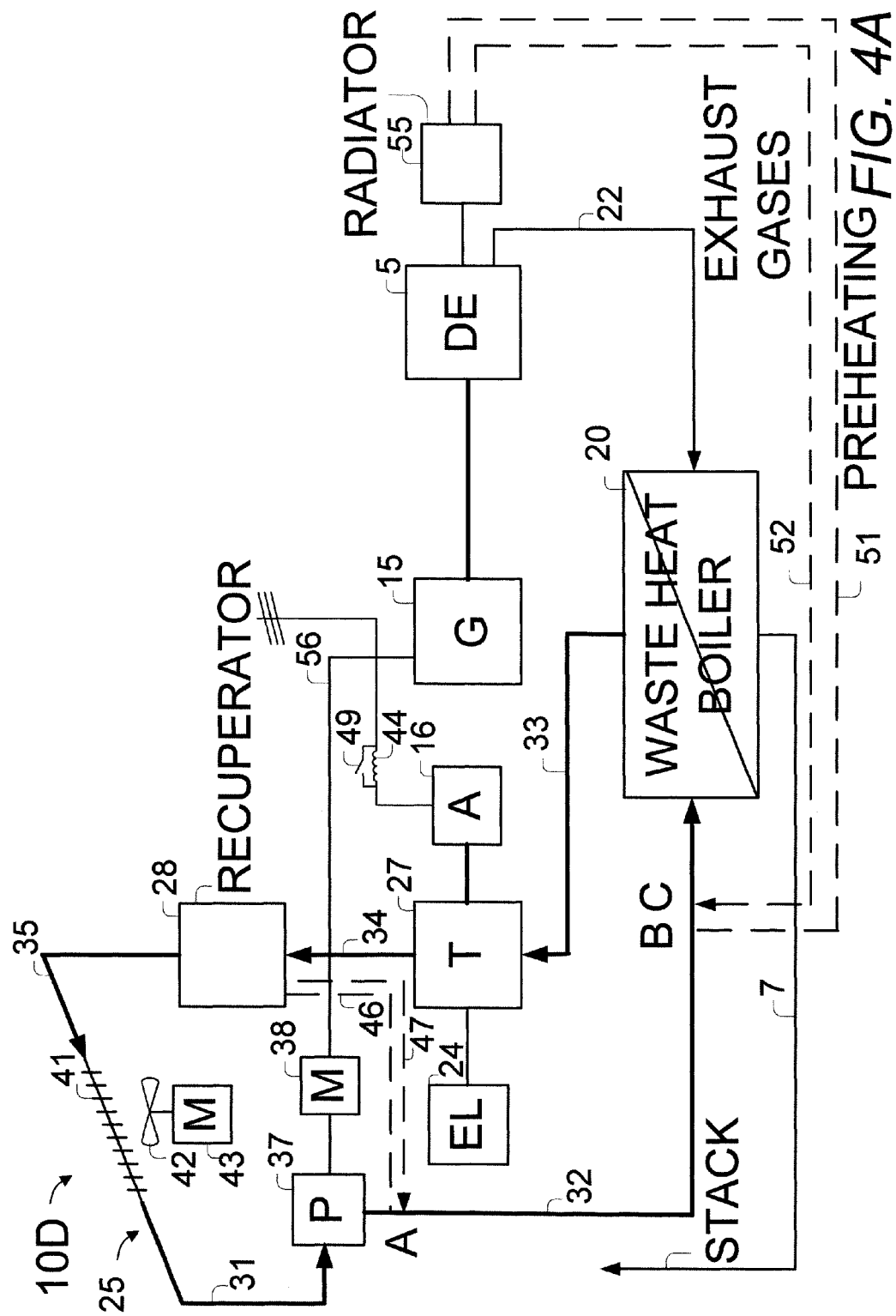

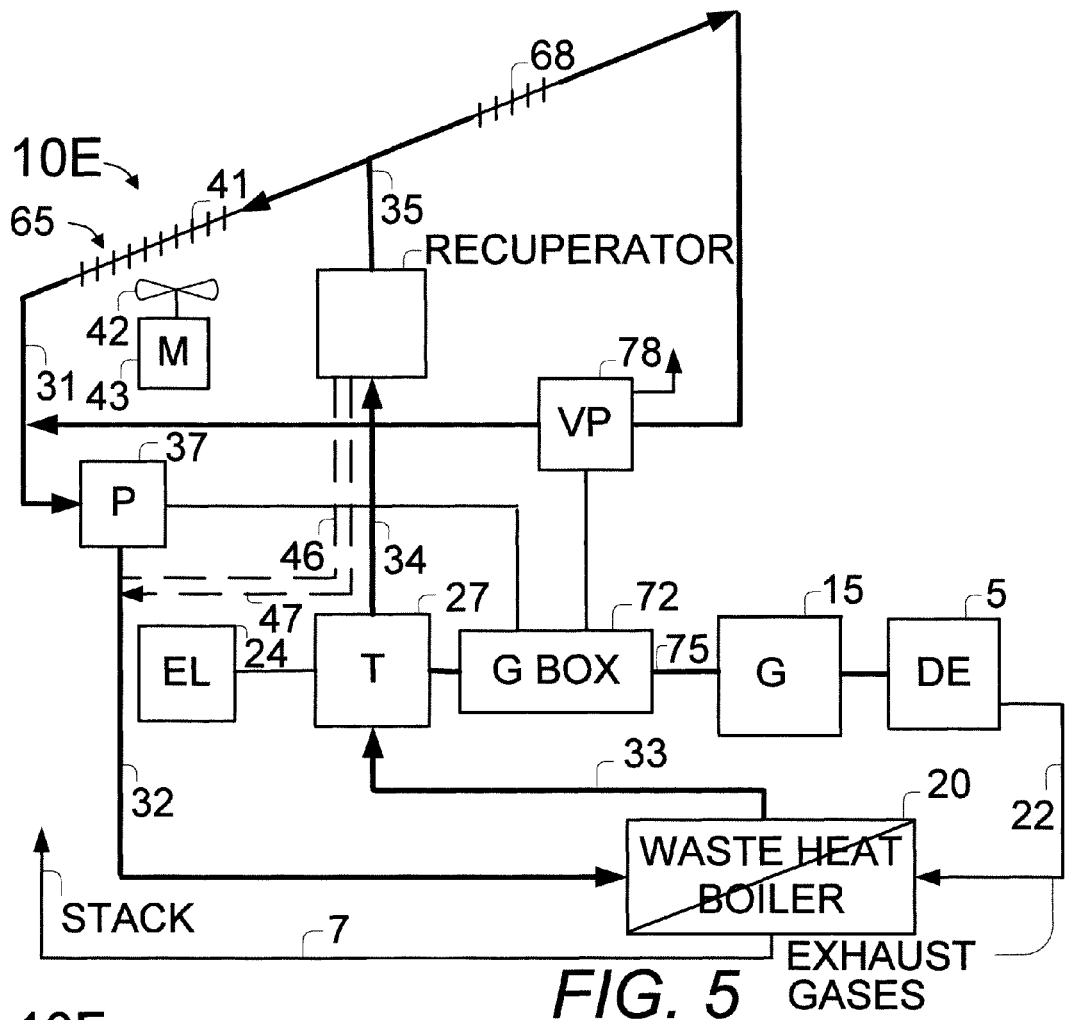
FIG. 5
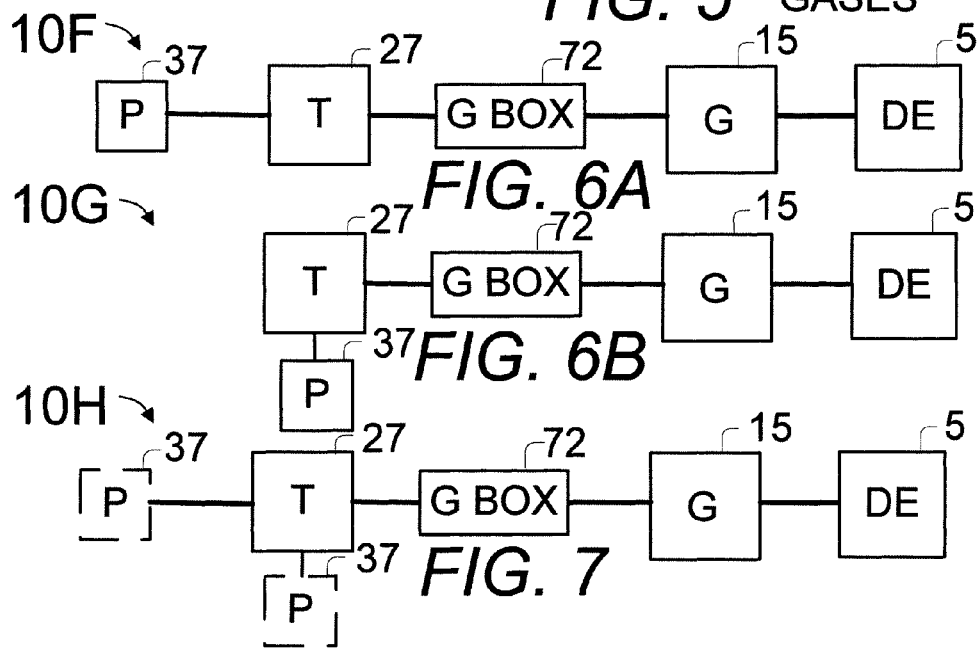
FIG. 6A
FIG. 6B
FIG. 7

INTEGRATED ENGINE GENERATOR RANKINE CYCLE POWER SYSTEM

CROSS-REFERENCE TO RELATED APPLICATIONS

This application is a continuation-in-part of and claims the benefit of priority under 35 U.S.C. §120 from U.S. Ser. No. 10/849,502, filed May 20, 2004, which is a continuation-in-part to U.S. Ser. No. 10/152,356, filed May 22, 2002, the entire contents of this application is incorporated herein by reference.

FIELD OF THE INVENTION

The present invention relates to the field of power plant systems. More particularly, the invention relates to a power plant system which utilizes the waste heat of an engine generator to produce additional power.

BACKGROUND OF THE INVENTION

Many combined cycle power plants using a gas turbine and steam turbine operating on the gases exiting the gas turbine have been used lately. The capacity of such combined cycle power plants is usually about 100-200 MW.

The possibility of employing both a diesel engine and an organic Rankine cycle (ORC) power unit to increase thermal efficiency in a combined cycle power plant configuration has been suggested. The use of both a diesel engine and an ORC power unit in a combined cycle power plant presents power plant designers with difficulties in terms of integrating the two different, simultaneously operating thermodynamic cycles. Firstly, a diesel engine is an internal combustion engine, while an ORC power unit is an external combustion engine. These two thermodynamic cycles therefore require different regimes of operation. That is, a diesel engine can be designed to operate at certain, fixed rotational speeds or within a given range depending on the use. The efficiency of an ORC power unit, on the other hand, is dependent on the rotational speed of the turbine and operates more efficiently at an optimal rotational speed. Secondly, diesel engines which are adapted for standby and peaking applications are able to start operating when cold and generate a maximum amount of power in only a few seconds. However, an ORC power unit cannot generate power prior to an initial start-up period of approximately 20-25 minutes during which hot vapors for driving the turbine need to be generated. Also, the turbine of a low-capacity ORC power unit is lubricated by means of the working fluid condensate, and a start-up period is needed to properly lubricate the turbine.

Another difference between diesel engines and an ORC power unit is that a diesel engine has a significantly greater number of components that need to be controlled and maintained than that of an ORC power unit. With respect to a diesel engine, at least the following components need to be controlled: the fuel injector, the governor for regulating the amount and pressure of fuel to be injected, the camshaft to provide the proper timing of fuel injection, and turbocharging systems for boosting power, improving combustion efficiency, and reducing emissions. J. Anderson in "Clean Diesel Generators—The Future is Here," Power Topic #301, Cummins Power Generation describes that the control strategies of a diesel engine are aimed to optimize the combustion process while producing the least amount of both $NO_x$ and particulates per unit of power output, these strategies including the use of electronic engine controls, such as electronic sensors and microprocessor-based controls, and electronic injection systems. In an ORC power unit, an optimal power output can be achieved by controlling substantially only the fuel burner that produces and supplies to the vaporizer a given amount combustion gases from the fuel supplied to the fuel burner, when the power plant is not a combined cycle, and the rotational speed of the turbine.

U.S. Pat. Nos. 4,590,384 and 6,526,754, the disclosures of which are hereby incorporated by reference, disclose a combined cycle power plant by which hot exhaust gases of a diesel engine are used to vaporize organic working fluid of an ORC power unit. While such plants can produce approximately 10-20% additional power with respect to a conventional diesel engine, it would be desirable to further increase the power output of the plant. U.S. Pat. No. 6,883,328, the disclosure of which is also hereby incorporated by reference, on the other hand, discloses a combined cycle power plant wherein the hot exhaust gases of the diesel engine are used to produce vaporized working fluid of ORC power unit and wherein in addition, the ORC power unit can produce 100% of power produced once the diesel engine stops operation. U.S. patent application Ser. No. 10/849,502, the disclosure of which is also hereby incorporated by reference, which claims priority to Israel Patent Application 158989, and which is a Continuation-in-Part patent application of U.S. patent application Ser. No. 10/152,356, which matured into U.S. Pat. No. 6,883,328, mentioned above, discloses an ORC power unit operating from the exhaust heat gases of a high temperature fuel cell system such as a molten carbonate fuel cell system.

As described above, the control of each of a diesel engine and an ORC power unit is different, and at times, may be contradictory; for example, a diesel engine may be controlled to achieve a fast start-up, while such a control is not feasible for an ORC power unit. Prior art combined cycle power plants comprising both a diesel engine and an ORC power unit have employed a separate control system for each of the thermodynamic cycles due to their lack of control compatibility. When the combined cycle power plant has a capacity greater than, e.g. about 5 MW, a power plant employing two separate control systems, interconnections between the engine generator(s) and an ORC power unit, and expensive exhaust interconnections from the diesel engines may be cost effective due to the use of heat recovery cycles. However, the cost effectiveness of such a capacity combined cycle power plant employing two separate control systems for the start-up, synchronization, and continuous control of both the diesel engine and ORC power unit is lacking.

There is therefore a need for a single control system for a combined cycle power system by which hot exhaust gases of an engine generator are used to vaporize the organic working fluid of an ORC power unit.

It is an object of the present invention to provide an integrated engine generator Rankine cycle power system, especially one having a capacity of less than about 5 MW, of an increased efficiency of the use of the power output.

It is an additional object of the present invention to provide an integrated engine generator Rankine cycle power system having a single control system.

Other objects and advantages of the invention will become apparent as the description proceeds.

SUMMARY OF THE INVENTION

The present invention provides an integrated engine generator Rankine cycle power system which increases the efficiency of the use of its power output. As referred to herein, the term "net power output" means the difference between the power generated by the power system and the power consumed by its components.

The system comprises a closed Rankine cycle power generating unit through which working fluid flows and an engine generator, the closed Rankine cycle power generating unit including a waste heat boiler for vaporizing said working fluid by means of exhaust gases discharged from the engine generator, an expander in which the vaporized working fluid expands and performs work to drive a shaft for producing mechanical power, or an electric generator coupled thereto and adapted to produce electrical power, from both the engine generator and the expander, and an external lubrication system in fluid communication with the expander wherein one or more closed Rankine cycle power generating unit components are operationally connected to the electric generator.

In a preferred alternative, the system comprises a closed Rankine cycle power generating unit through which working fluid flows and an engine generator, the closed Rankine cycle power generating unit including a waste heat boiler for vaporizing the working fluid by means of exhaust gases discharged from the engine generator, an expander in which the vaporized working fluid expands and performs work to drive an asynchronous motor/generator connected to the electric grid, and an external lubrication system in fluid communication with the expander, the engine generator driving an electric generator also connected to the electric grid, wherein one or more Rankine cycle components are operationally connected to the output of said electric generator.

In one embodiment of the present of the invention, one or more of the Rankine cycle components are in electrical communication with the electric generator.

In another embodiment of the present of the invention, one or more of the Rankine cycle components are mechanically connected to an electric generator main shaft.

The working fluid may be selected from the group of Therminol®, Dowtherm J, dodecane, isododecane, methylundecane, neopentane, octane, and steam.

A Rankine cycle component can be selected from the group of feed pump, feed pump motor, vapor pump, vapor pump motor, blower, and blower motor.

In a further embodiment, the Rankine cycle power generating system comprises a feed pump for delivering working fluid condensate to the waste heat boiler, an expander which receives vaporized working fluid from the waste heat boiler and performs work thereby, a recuperator which receives heat depleted working fluid vapor from the expander and heats thereby condensate extracted from feed pump discharge, and a condenser for condensing working fluid exiting the recuperator. The system can also comprise a vapor pump for discharging non-compressible gases.

The system preferably further comprises means for preheating the recuperated condensate, such as a radiator in fluid communication with the engine generator, a first line through which working fluid condensate is extracted and delivered to said radiator, and a second line for delivering preheated condensate upstream to the waste heat boiler.

In one aspect of the invention, the expander is directly coupled to the electric generator.

In another aspect of the invention, the expander is coupled to the electric generator by means of reduction gearing.

The present invention is also directed to a control system for an integrated engine generator Rankine cycle power system, comprising a common controller in electrical communication with both components of a closed organic Rankine cycle (ORC) power generating system and components of an engine generator, the engine generator preferably coupled to an expander included in said ORC power generating system by means of a connection passing through an electric generator powered by both said ORC expander and said engine generator, and said closed organic Rankine cycle (ORC) power generating system provided with an external lubrication system in fluid communication with said expander and including a waste heat boiler adapted to vaporize the working fluid by means of exhaust gases discharged from the engine generator.

The controller is adapted to transmit a signal to an external lubrication system in fluid communication with the expander simultaneously with, or immediately after, transmission of a signal from a component of the engine generator. Thus, the expander will be fully lubricated and rotating at the desired speed when the exhaust gases of the engine generator are sufficiently hot to vaporize the working fluid of the ORC power generating system and to drive the expander.

Examples of the engine generators include, in accordance with the present invention, a diesel engine(s), a gasoline engine(s), a gas engine(s) or a gas turbine(s), etc.

Examples of the expander included in the closed Rankine cycle power generating unit include a turbine(s), a volumetric expander(s) of a piston, vane or screw type, etc.

BRIEF DESCRIPTION OF THE DRAWINGS

Embodiments of the present invention are described by way of example with reference to the drawings wherein:

FIG. 1 is a schematic illustration of an embodiment of single common control system for an integrated engine generator Rankine cycle power system according to the present invention;

FIG. 2 is a schematic illustration of a mechanical connection between a engine generator and an organic Rankine cycle expander, according to one embodiment of the present invention;

FIG. 4A is a block diagram of a power system according to another embodiment of the present invention;

FIG. 5 is a block diagram of a power system according to a further embodiment of the present invention;

FIGS. 6A-B are schematic illustrations of two different arrangements, respectively, by which a feed pump is mechanically connected to a gearbox being driven by a shaft connected to an engine generator in accordance with an embodiment of the present invention; and FIG. 7 is a schematic illustration of an arrangement by which the rotational speed of an organic Rankine cycle expander is controlled by means of a hydraulic transmission being driven by a shaft connected to an engine generator in accordance with an embodiment of the present invention.

Similar reference numerals indicate similar components.

DETAILED DESCRIPTION OF PREFERRED EMBODIMENTS

Figure 3:
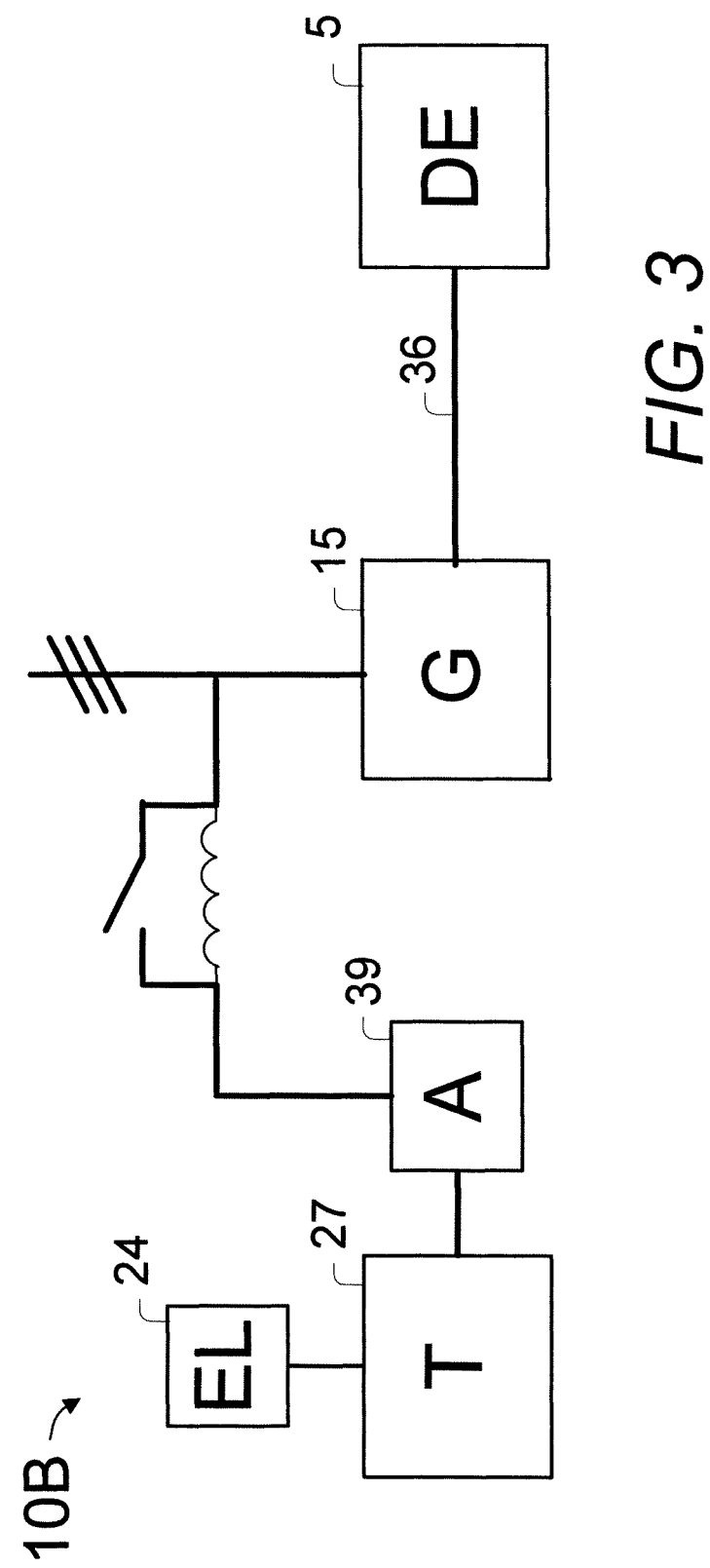
FIG. 3 is a schematic illustration of an integrated engine generator Rankine cycle power system according to an alternative embodiment of the present invention.

The present invention is related to a novel combined cycle power plant in which an engine generator such as a diesel engine (DE) is coupled with an expander, such as a turbine of an organic Rankine cycle (ORC) power generating unit or system in order to form an integrated engine generator Rankine cycle power system. Although prior art diesel engine integrated Rankine cycle power plants employ a generator that is common to both the diesel engine and ORC power unit, two separate control systems are needed for each thermodynamic cycle. By virtue of the connection between the diesel engine and the ORC power unit, a common control system may be employed by which the efficiency of the use of its power output is increased and faster start-ups can be achieved than what has been realized heretofore in prior art combined cycle power plants.

Before describing the components of the combined power plant system of the present invention, reference is first made to FIG. 1, which schematically illustrates the common control system, which is designated generally by numeral 30 for controlling power system 10. Control system 30 comprises power system 10 having engine generator, such diesel engine DE 5, electric generator 15, and expander, such as turbine, 27 of the ORC power unit, as well as controller 45, which is in electrical communication with both DE 5 and turbine 27. Hot exhaust gases of DE 5 vaporize the working fluid of the ORC power unit and the vaporized working fluid drives turbine 27, turbine 27 being provided with external lubrication system 24, to provide lubrication to the bearings of turbine 27. This arrangement permits quick start-up for turbine 27. Electricity is produced by electric generator 15. DE 5 and turbine 27 are advantageously coupled together by means of connection 13, which passes through electric generator 15. Since connection 13 causes simultaneous operation of DE 5 and turbine 27, control signals transmitted by the single controller 45 ensure synchronous and continuous operation of the two thermodynamic cycles, as will be described hereinafter.

Connection 13 may be a mechanical connection. When the mechanical connection is a single shaft that is connected between DE 5 and turbine 27, this shaft is driven by the mechanical torque produced by DE 5, or any other suitable internal combustion engine, at one end thereof, while the mechanical torque produced by turbine 27 of the ORC power unit drives the other end of the shaft once sufficient organic working fluid vapors are produced for rotating turbine 27. A rotor having windings is present on the shaft, and by use of an exciter, an EMF force is produced in the stator of generator 15, so that electricity transmittable to an electric grid may be generated.

In FIG. 2, the mechanical connection between DE 5 and turbine 27 is embodied by gearbox 29, to enable DE 5 and turbine 27 to operate at different rotational speeds. A first shaft 14 may be connected between DE 5 and gearbox 29, and a second shaft 17 may be connected between gearbox 29 and turbine 27. Hot exhaust gases of DE 5 vaporize the working fluid of the ORC power unit and the vaporized working fluid drives turbine 27, turbine 27 being provided with external lubrication system 24, to provide lubrication to the bearings of turbine 27 and permit its fast start-up. Electricity is produced by electric generator 15.

In FIG. 3, an alternative embodiment of an integrated engine generator organic Rankine cycle power unit in accordance with the present invention is shown which has DE 5 and expander, such as turbine, 27. Turbine 27 is driven by asynchronous motor/generator 39 acting as a motor during start-up, to allow the turbine to attain a sufficiently high speed for power production. Turbine 27 is provided with external lubrication system 24, to provide lubrication to the bearings of turbine 27. Asynchronous motor/generator 39 is in electrical communication with the electric grid via cable 48 and switch 49. During start-up, power is obtained from the electric grid via coil 44 and provided to asynchronous motor/generator 39 which operates as a motor to rotate turbine 27 the bearings of which are lubricated by external lubrication system 24. Thus, once DE 5 commences operation and a control signal is produced for permitting external lubrication system 24 to start lubricating turbine 27 and hot exhaust gases of DE 5 produce sufficient organic working fluid vapors for rotating turbine 27, switch 49 is closed and asynchronous motor/generator 39 operates as an electric generator so that electric power produced thereby is now supplied to the electric grid in addition to the electrical power produced by generator 15 operated by DE 5. The start-up time of the ORC can therefore be considerably improved. Rather than having to wait 20-30 minutes for producing sufficient working fluid condensate to lubricate the bearings of turbine 27, as has been practiced in the prior art, asynchronous motor/generator 39 acting as a motor drives turbine 27 which may be advantageously activated due to the use of the external lubrication system before the exhaust gases of DE 5 are sufficiently hot. Switch 49 is shut to permit asynchronous motor/generator 39 to operate as an electric generator after sufficient organic working fluid vapors are produced by the hot exhaust gases of DE 5 to produce power from turbine 27.

One consequence of coupling or associating the DE to the turbine of the ORC power unit is that the combined cycle power plant can increase the efficiency of the use of its power output. In addition to utilizing the hot exhaust gases of the diesel engine to vaporize the working fluid of a closed Rankine cycle power unit and to thereby generate additional power by means of an organic turbine, the power system of the present invention advantageously reduces the power needs of its auxiliary components by coupling the latter to the power system generator. Connection 36 between DE 5 and generator 15 may be a shaft.

Figure 4:
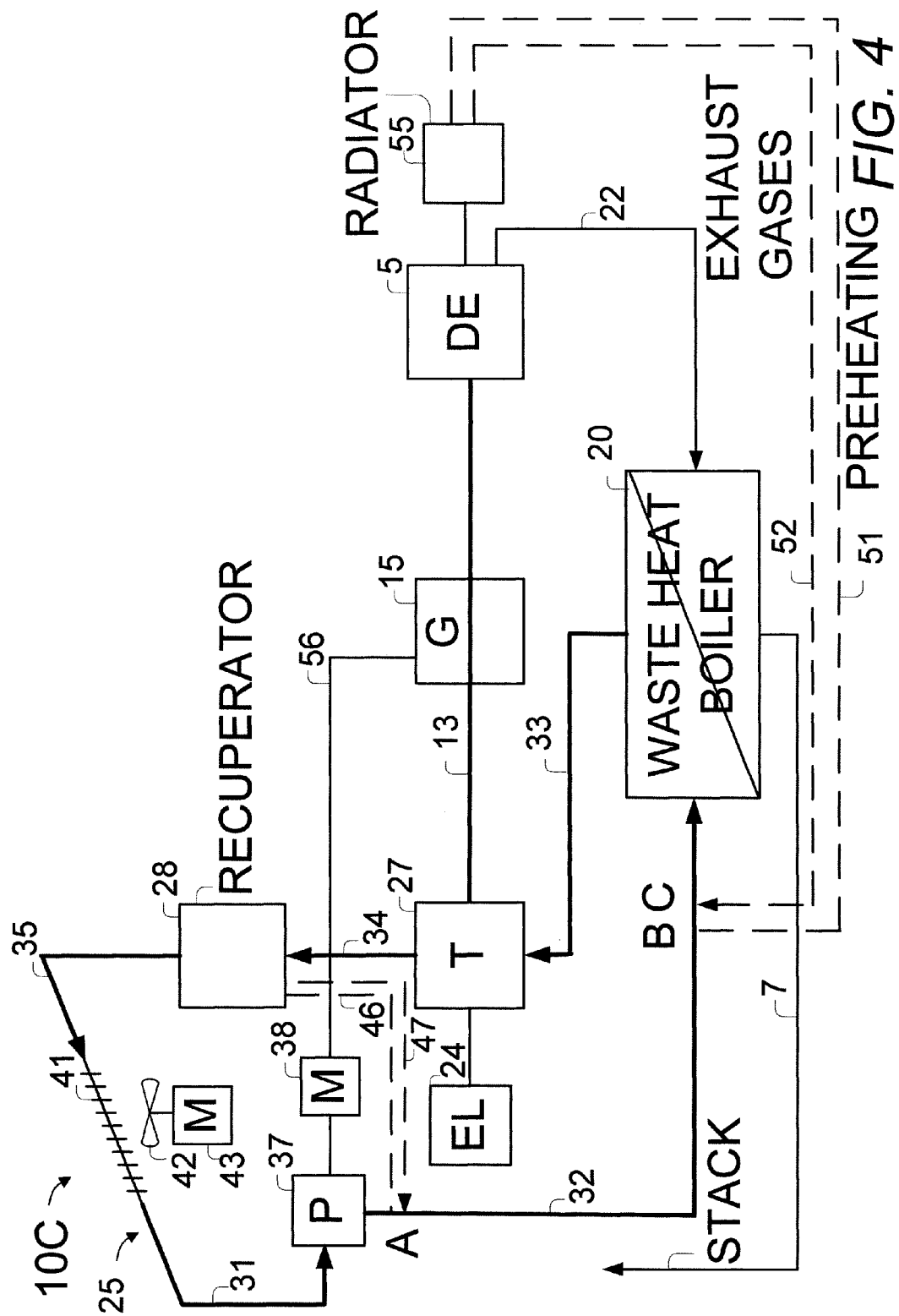
FIG. 4 is a block diagram of a power system according to one embodiment of the invention.

FIG. 4 illustrates a block diagram of a power system according generally designated by reference numeral 10C which shows the inclusion of auxiliary components, according to one embodiment of the present invention. Power system 10C comprises engine generator, such as diesel engine, 5, electric generator 15 coupled to diesel engine 5 for supplying electrical power to an electrical network, and a Rankine cycle power unit 25, which is represented by bold lines and having a working fluid to which heat is transferred by means of waste heat boiler 20 which receives exhaust gases of diesel engine 5 via line 22. The working fluid may be an organic working fluid, such as Therminol™, which is manufactured by Solutia Inc., USA and is an alkyl-substituted aromatic fluid, Dowtherm J, which is manufactured by The Dow Chemical Company, USA, and is a mixture of isomers of an alkylated fluid, dodecane, isododecane, methylundecane, neopentane, and octane, or may be steam. Expander, such as turbine, 27 of Rankine cycle power unit 25 is an organic cycle turbine when the working fluid is an organic working fluid and is a steam turbine when the working fluid is steam, lubricated by external lubrication system 24 which permits fast start-up of turbine 27.

Rankine cycle power unit 25 is a closed cycle power unit, and its working fluid flows through conduits 31-35. Feed or cycle pump 37 delivers condensed working fluid to waste heat boiler 20 via conduit 32. As the exhaust gases from diesel engine 5 flow through waste heat boiler 20 and are then discharged to a stack via line 7, the temperature of the working fluid supplied to waste heat boiler 20 consequently rises and vapors are produced The vaporized working fluid is supplied from waste heat boiler 20 via conduit 33 to turbine 27, which is also coupled to electric generator 15. Turbine 27 is either directly coupled to generator 15 or coupled thereto by means of a reduction gear. The vaporized working fluid is expanded in turbine 27 and electricity is produced by electric generator 15 in addition to that which is generated by means of diesel engine 5. Expanded working fluid vapor flows, preferably to recuperator 28, via line 34. Heat depleted expanded working fluid vapor exiting recuperator 28 is supplied via conduit 35 to condenser 41, preferably an air-cooled condenser, wherein working fluid condensate is produced using blower 42 driven by electric motor 43.

Working fluid condensate discharged by feed or cycle pump 37 is preferably extracted through line 46 to recuperator 28, wherein heat is transferred from expanded working fluid supplied thereto to the working fluid condensate. The heated working fluid condensate is preferably then returned to conduit 32 via line 47 at point A. Preferably, the working fluid condensate is further preheated by means of radiator 55 and serves to cool, diesel engine 5. Heated working fluid condensate is extracted through line 51 at point B to radiator 55. The preheated working fluid is preferably then returned to conduit 32 via line 52 at point C. In this fashion, the heat content of the fuel burned by diesel engine 5 is more efficiently utilized, and brings about an increase in the power generated by the integrated engine generator organic Rankine cycle power unit. The bleed lines are represented by dashed lines.

Feed or cycle pump motor 38 is in electrical communication with electric generator 15 by means of cable 56. Since feed or cycle pump 37 is powered by electric generator 15, no additional power source is needed for operating the feed or cycle pump. Thus, the efficiency of the use of the power output of power system 10C is increased. Also, feed or cycle pump 37 will operate only during those periods when electric generator 15 produces electrical power by means of diesel engine 5 and turbine 27, thereby further increasing the efficiency of the use of the power output of power system 10C. It will be appreciated that motor 43 of blower 42, as well as other auxiliary components, can also be in electrical communication with electric generator 15 by corresponding cables (not shown).

FIG. 4A illustrates a block diagram of a power system according to an alternative embodiment of the present invention generally designated by reference numeral 10D and shows the inclusion of auxiliary components. Power system 10D comprises diesel engine 5, electric generator 15 coupled to diesel engine 5 for supplying electrical power to an electrical network, and a Rankine cycle power unit 25, which is represented by bold lines and having a working fluid to which heat is transferred by means of waste heat boiler 20 which receives exhaust gases of diesel engine 5 via line 22. The working fluid may be an organic working fluid, such as Therminol™, which is manufactured by Solutia Inc., USA and is an alkyl-substituted aromatic fluid, Dowtherm J, which is manufactured by The Dow Chemical Company, USA, and is a mixture of isomers of an alkylated fluid, dodecane, isododecane, methylundecane, neopentane, and octane, or may be steam. Expander, such as turbine 27 of Rankine cycle power unit 25 is an organic cycle turbine when the working fluid is an organic working fluid and is a steam turbine when the working fluid is steam, lubricated by external lubrication system 24 which permits fast start-up of turbine 27 wherein asynchronous motor/generator 39 operates, during start-up, as a motor, powered by power obtained from the electric grid via coil 44, to rotate turbine 27, the bearings of which are lubricated by the external lubrication system 24.

Rankine cycle power unit 25 is a closed cycle power unit, and its working fluid flows through conduits 31-35. Feed or cycle pump 37 delivers condensed working fluid to waste heat boiler 20 via conduit 32. As the exhaust gases from diesel engine 5 flow through waste heat boiler 20 and are then discharged to a stack via line 7, the temperature of the working fluid supplied to waste heat boiler 20 consequently rises and vapors are produced The vaporized working fluid is supplied from waste heat boiler 20 via conduit 33 to, and expanded in, turbine 27, which is coupled to an asynchronous motor/generator 39 which now operates, due to the closing of switch 49, as an electric generator so that electric power produced thereby is now supplied to the electric grid in addition to the electrical power produced by generator 15 operated by DE 5. Expanded working fluid vapor exiting turbine 27 flows, preferably, via line 34, to recuperator 28. Heat depleted expanded working fluid vapor exiting recuperator 28 is supplied via conduit 35 to condenser 41, which preferably is air-cooled, wherein working fluid condensate is produced using blower 42 driven by electric motor 43.

Working fluid condensate discharged by feed or cycle pump 37 is preferably extracted through line 46 to recuperator 28, wherein heat is transferred from expanded working fluid supplied thereto to the working fluid condensate. The heated working fluid condensate is preferably then returned to conduit 32 via line 47 at point A. Preferably, the heated working fluid condensate is further preheated by means of radiator 55 and serves to cool, diesel engine 5. Working fluid condensate is extracted through line 51 at point B to radiator 55. The preheated working fluid is preferably then returned to conduit 32 via line 52 at point C. In this fashion, the heat content of the fuel burned by diesel engine 5 is more efficiently utilized, and brings about an increase in the power generated by the integrated engine generator organic Rankine cycle power unit. The bleed lines are represented by dashed lines.

Feed or cycle pump motor 38 is in electrical communication with electric generator 15 by means of cable 56 to which asynchronous motor/generator 39 is also preferably connected. Since feed or cycle pump 37 is powered by electric generator 15, no additional power source is needed for operating the feed or cycle pump. Thus, the efficiency of the use of the power output of power system 10 is increased. Also, feed or cycle pump 37 will operate only during those periods when electric generator 15 produces electrical power by means of diesel engine 5 and turbine 27, thereby further increasing the efficiency of the use of the power output of power system 10D. It will be appreciated that motor 43 of blower 42, as well as other auxiliary components, may also be in electrical communication with electric generator 15 by a corresponding cable (not shown).

FIG. 5 illustrates a block diagram of power system 10E similar to the power system 10C of FIG. 4 according to a further embodiment of the present invention, FIG. 5 also showing auxiliary components. Power system 10E comprises diesel engine 5, electric generator 15 coupled to diesel engine 5, and a closed Rankine cycle power unit 65 having a working fluid to which heat is transferred by means of waste heat boiler 20 which receives exhaust gases of diesel engine 5 via line 22. The vaporized working fluid is supplied from waste boiler 20 via line 33 to turbine 27 where it is expanded as work is performed. Expanded working fluid vapor exits turbine 27 via line 34 preferably to recuperator 28. The heat depleted working fluid vapor exiting recuperator 28 via conduit 35 branches to conduits 61 and 62. The working fluid vapor flowing through conduit 61 is condensed by condenser 41, preferably air-cooled, and the working fluid flowing through conduit 62 is condensed by secondary condenser 68. Vapor pump 78 in fluid communication with conduit 62 discharges all non-condensable gases that have entered conduit 62. Working fluid condensate is delivered from vapor pump 78 via conduit 79 to conduit 31. The working fluid condensate produced by condensers 41 and 68 is delivered by feed pump 37 to waste heat boiler 20 via conduit 32. Before being introduced to waste heat boiler 20, the working fluid condensate is preferably extracted to and from recuperator 28 via lines 46 and 47, respectively. In this embodiment, feed pump 37 and vapor pump 78 are driven by means of gearbox 72 or a clutch (not shown) mechanically connected with main shaft 75 of electric generator 15.

FIGS. 6A-B illustrate two different arrangements, according embodiments of the present invention, by which feed pump 37 is mechanically connected to gearbox 72. In FIG. 6A feed pump 37 is driven by turbine 27, which in turn is driven by gearbox 72. In FIG. 6B, gearbox 72 directly drives both turbine 27 and feed pump 37 in parallel.

In FIG. 7, the rotational speed of turbine 27 is controlled by means of hydraulic transmission 58, which is driven by shaft 14 connected to DE 5 and passing through electric generator 15. Feed pump 37 may be connected to turbine 27 or to hydraulic transmission 58.

These arrangements shown and described with reference to FIGS. 5, 6A-B and 7 can be used in all the embodiments of the present invention.

Referring back to FIG. 1, controller 45 is operable to control the operation of both DE 5 and expander, such as organic turbine, 27. Controller 45 is also operable to control the operation of the components of the ORC power unit, including the Rankine cycle components associated with working fluid condensate, such as the feed pump, the feed pump motor, the vapor pump, the vapor pump motor, the blower, and the blower motor.

Upon receiving a request for generating electricity, whether initiated by an operator or in response to a sudden increase in load, controller 45 transmits an activation signal to the governor of DE 5 to commence the operation of DE5 thus bringing into operation the components of DE 5 including its fuel injectors, its crackshaft, its camshaft system, its intake and extraction valves, its pistons as well as its turbocharger system if included.

Connection 13 is operatively connected to the crankshaft or output shaft of diesel engine 5, and therefore expander, such as organic turbine, 27 begins to rotate upon operation of the crankshaft or output shaft of diesel engine 5. To prevent thermal damage to turbine 27, controller 45 transmits an activation or control signal to external lubrication system 24 simultaneously with, or immediately after, the transmission of the signals to the governor and fuel injector. Thus, turbine 27 will be fully lubricated and rotating at the desired speed when the exhaust gases of DE 5 are sufficiently hot to vaporize the organic working fluid of the ORC power unit and to supply working fluid vapors to drive turbine 27.

Feed pump 37 of the ORC power unit is operatively connected to generator 15, as illustrated in FIGS. 4-7. Accordingly, feed pump 37 will start pumping condensate to waste heat boiler 20 only after generator 15 produces a sufficiently high level of electricity. Controller 45 is also adapted to regulate operation of fan 42 in order to provide sufficient cooling to condenser 41.

The implementation of the present invention can therefore facilitate faster start-ups and an increased efficiency of the use of the power output of the integrated engine generator Rankine cycle power system.

While a diesel engine or diesel engines have been described with references to the drawings as an example of an engine generator, examples of other engine generators suitable for use in accordance with the present invention as described above and in particular with reference to the various embodiments described by referring to the accompanying drawings, include, in accordance with the present invention, a gasoline engine(s), a gas engine(s) or a gas turbine(s), etc.

Furthermore, while a turbine or turbines have been described with references to the drawings as an example of an expander, examples of other expanders included in the closed Rankine cycle power generating unit described above and in particular with reference to the various embodiments described by referring to the accompanying drawings, include a volumetric expander(s) of a piston, vane or screw type, etc.

While the above description of the invention and its embodiments describe an integrated engine generator Rankine cycle power system which include an electric generator and an asynchronous motor/engine (see e.g. the description of the embodiment described with reference to FIGS. 3 and 4a), the expander can drive a shaft for producing mechanical power.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. An integrated engine, electric generator, Rankine cycle power system comprising a closed organic Rankine cycle power generating unit through which a condensable organic working fluid flows, an engine, and an electric generator operationally coupled to the engine, said closed organic Rankine cycle power generating unit including:
   a waste heat boiler for vaporizing said condensable organic working fluid by means of exhaust gases discharged from said engine,
   an expander in which the vaporized organic working fluid expands and performs work, the expander being operationally coupled to the electric generator to drive the electric generator, wherein the expander and engine have a common driven shaft which comprises the drive shaft for the electrical generator, whereby said electric generator may be driven by, and produces electrical power from, both said engine and said expander via said common shaft;
   an external lubrication system in fluid communication with the expander;
   a controller connected to the engine and the external lubrication system, the controller including operating logic which transmits a signal to start operation of the external lubrication system substantially simultaneously with transmitting a signal to start operation of the engine;
   a feed pump connected for delivering organic working fluid condensate to the waste heat boiler; and
   a recuperator connected to receive all of the expanded organic working fluid vapor from said expander and the organic working fluid condensate from said feed pump, to heat the organic working fluid condensate.

2. The power system according to claim 1, wherein one or more of the Rankine cycle components are in electrical communication with said electric generator.

3. The power system according to claim 1, wherein the organic working fluid is selected from the group of Therminol®, Dowtherm J, dodecane, isododecane and methylundecane.

4. The power system according to claim 1 wherein said expander comprises a turbine.

5. The power system according to claim 1, further comprising means for preheating the recuperated condensate.

6. The power system according to claim 5, wherein the means for preheating the recuperated condensate comprises a radiator in fluid communication with the engine, a first line through which working fluid condensate is extracted and delivered to said radiator, and a second line for delivering preheated condensate upstream to the waste heat boiler.

7. The power system according to claim 1 wherein said engine comprises a diesel engine.

8. The power system according to claim 1, wherein said closed organic Rankine cycle power generating unit further comprises a vapor pump for discharging non-compressible gases.

9. The power system according to claim 1, wherein the common shaft includes reduction gearing.

10. A control system for an integrated engine, electric generator, Rankine cycle power system, comprising:
a common controller in electrical communication with both components of a closed organic Rankine cycle power generating unit through which a condensable organic working fluid flows and with components of an engine, wherein an expander of the closed organic Rankine cycle power generating unit and said engine have a common driven shaft which comprises the drive shaft for the electric generator, whereby said electric generator may be powered by both said closed organic Rankine cycle power generating unit and said engine via said common shaft, and
said closed organic Rankine cycle power generating unit is provided with an external lubrication system in fluid communication with said expander and includes a waste heat boiler adapted to vaporize said condensable organic working fluid by means of exhaust gases discharged from said engine, a feed pump connected for delivering organic working fluid condensate to the waste heat boiler, and a recuperator connected to receive expanded organic working fluid vapor from said expander and the organic working fluid condensate from said feed pump, to heat the organic working fluid condensate,
said common controller including operating logic which drives said external lubrication system during start-up of the closed organic Rankine cycle power generating unit, substantially simultaneously with transmitting a signal to start operation of the engine.

11. The control system according to claim 10, wherein the controller is adapted to transmit a signal to an external lubrication system in fluid communication with the expander simultaneously with, or immediately after, transmission of a signal from a component of the engine.

12. An integrated engine, generator, Rankine cycle power system comprising:
a closed organic Rankine cycle power generating unit through which a condensable organic working fluid flows, and
an engine,
said closed organic Rankine cycle power generating unit including a waste heat boiler for vaporizing said organic working fluid by means of exhaust gases discharged from said engine, an expander in which the vaporized organic working fluid expands and performs work, and a recuperator connected to receive expanded organic working fluid vapor from said expander and organic working fluid condensate, to heat the organic working fluid condensate, and
an asynchronous motor/generator connected to the electric grid and connected to drive the expander during start-up of the expander,
an external lubrication system in fluid communication with the expander, and
a controller connected to the engine and the external lubrication system, the controller including operating logic which transmits a signal to start operation of the external lubrication system upon the start of the engine.

13. An integrated engine, electric generator, Rankine cycle power system comprising:
(a) an engine;
(b) a closed organic Rankine cycle power generating unit through which organic working fluid flows, said closed organic Rankine cycle power generating unit including:
i. a waste heat boiler for producing organic working fluid vapor by means of hot exhaust gases discharged from said engine;
ii. an organic working fluid expander which receives vaporized organic working fluid from the waste heat boiler and in which the vaporized organic working fluid expands and performs work to drive an electric generator coupled thereto, and adapted to produce electrical power from both said engine and said expander;
iii. a condenser for condensing heat depleted expanded organic working fluid vapor;
iv. a feed pump for delivering organic working fluid condensate to the waste heat boiler;
v. a recuperator which receives expanded organic working fluid vapor from said expander prior to supplying it to said condenser and heats organic working fluid condensate supplied by said feed pump from the condenser; and
vi. a preheater for preheating the organic working fluid condensate supplied from said recuperator, the preheater comprising a radiator in fluid communication with the engine, a first line through which organic working fluid condensate is extracted and delivered to said radiator, and a second line for delivering preheated organic working fluid condensate upstream to the waste heat boiler;
(c) an external lubrication system in fluid communication with the organic working fluid expander;
(d) wherein the expander of said closed organic Rankine cycle power generating unit and the engine have a common driven shaft which comprises the drive shaft for said electric generator, whereby the electric generator may be driven by both said engine and said expander via said common shaft; and
a controller connected to the engine and the external lubrication system, the controller including operating logic which transmits a signal to start operation of the external lubrication system substantially simultaneously with transmitting a signal to start operation of the engine.

14. The power system according to claim 8, wherein said vapor pump for discharging non-compressible gasses is driven by reduction gearing included in said common shaft.

15. The power system according to claim 1, wherein the working fluid is selected from the group of Therminol®, Dowtherm J, dodecane, isododecane and methylundecane.

* * * * *